United States Patent
Rowlands et al.

(10) Patent No.: US 7,028,115 B1
(45) Date of Patent: Apr. 11, 2006

(54) SOURCE TRIGGERED TRANSACTION BLOCKING

(75) Inventors: Joseph B. Rowlands, Santa Clara, CA (US); Mark D. Hayter, Menlo Park, CA (US)

(73) Assignee: Broadcom Corporation, Irvine, CA (US)

(*) Notice: Subject to any disclaimer, the term of this patent is extended or adjusted under 35 U.S.C. 154(b) by 825 days.

(21) Appl. No.: 09/680,524

(22) Filed: Oct. 6, 2000

(51) Int. Cl.
*G06F 13/00* (2006.01)

(52) U.S. Cl. .................. 710/107; 710/110; 710/240

(58) Field of Classification Search ............... 710/305, 710/317, 111, 100, 107, 309, 311, 313, 316, 710/109, 310, 113, 110, 240–244; 711/154
See application file for complete search history.

(56) References Cited

U.S. PATENT DOCUMENTS

| | | | |
|---|---|---|---|
| 5,778,414 A | | 7/1998 | Winter et al. |
| 6,021,451 A | * | 2/2000 | Bell et al. ............ 710/309 |
| 6,076,132 A | * | 6/2000 | Chen .................. 710/241 |
| 6,092,137 A | * | 7/2000 | Huang et al. ........ 710/111 |
| 6,141,715 A | * | 10/2000 | Porterfield ........... 710/113 |
| 6,157,623 A | | 12/2000 | Kerstein |
| 6,237,055 B1 | * | 5/2001 | Trieu et al. .......... 710/113 |
| 6,262,594 B1 | | 7/2001 | Cheung et al. |
| 6,275,885 B1 | * | 8/2001 | Chin et al. ........... 710/311 |
| 6,321,309 B1 | * | 11/2001 | Bell et al. ............ 711/150 |
| 6,457,077 B1 | * | 9/2002 | Kelley et al. ......... 710/56 |
| 6,611,906 B1 | * | 8/2003 | McAllister et al. ..... 711/168 |
| 6,678,767 B1 | * | 1/2004 | Cho et al. ............ 710/100 |
| 6,704,409 B1 | * | 3/2004 | Dilip et al. ........... 379/265.02 |

FOREIGN PATENT DOCUMENTS

| | | |
|---|---|---|
| WO | 00/30322 | 5/2000 |
| WO | 00/52879 | 9/2000 |

OTHER PUBLICATIONS

Halfhill, "SiByte Reveals 64-Bit Core for NPUs," Microprocessor Report, Jun. 2000, pp. 45-48.
*Pentium® Pro Family Developer's Manual, vol. 1: Specifications,* Chapter 4, pp. 1-18, 1996.
SiByte, "Target Applications," http://sibyte.com/mercurian/applications.htm, Jan. 15, 2001, 2 pages.

(Continued)

*Primary Examiner*—Paul R. Myers
*Assistant Examiner*—Kim T. Huynh
(74) *Attorney, Agent, or Firm*—Garlick Harrison & Markison LLP

(57) ABSTRACT

A system may include at least a first agent and a second agent, and the first agent may be coupled to receive a block signal generated by the second agent. The block signal is indicative of whether or not the second agent is capable of participating in transactions. The first agent initiates or inhibits initiation of a transaction for which the second agent is a participant responsive to the block signal. The system may include additional agents, each configured to generate independent block signals. Other implementations may share block signals among two or more agents. For example, a memory block signal indicative of memory transactions being blocked or not blocked and an input/output (I/O) block signal indicative of I/O transactions being blocked or not blocked may be employed. In yet another implementation, a first agent may provide separate block signals to other agents.

44 Claims, 9 Drawing Sheets

OTHER PUBLICATIONS

SiByte, "SiByte Technology," http://sibyte.com/mercurian/technology.htm, Jan. 15, 2001, 3 pages.

SiByte, "The Mercurian Processor," http://sibyte.com/mercurian, Jan. 15, 2001, 2 pages.

SiByte, "Fact Sheet," SB-1 CPU, Oct. 2000, rev. 0.1, 1 page.

SiByte, "Fact Sheet," SB-1250, Oct. 2000, rev. 0.2, 10 pages.

Stepanian, SiByte, SiByte SB-1 MIPS64 CPU Core, Embedded Processor Forum 2000, Jun. 13, 2000, 15 pages.

Jim Keller, "The Mercurian Processor: A High Performance, Power-Efficient CMP for Networking," Oct. 10, 2000, 22 pages.

"ATLAS I: A Single-Chip, Gigabit ATM Switch with HIC/HS Links and Multi-Lane Back-Pressure," Katevenis, et al., IPC Business Press LTD., Long, GB, vol. 21, No. 7-8, Mar. 30, 1998, XP004123981, 5 pages.

"An Introductory VHDL Tutorial: Chapter 1—An Introduction and Background," 1995, Green Mountain Computing Systems, XP002212233, 2 pages.

* cited by examiner

SOURCE TRIGGERED TRANSACTION BLOCKING

BACKGROUND OF THE INVENTION

1. Field of the Invention

This invention is related to the field of digital systems and, more particularly, to a mechanism for handling cases in which an agent is temporarily unable to participate in a transaction.

2. Description of the Related Art

A bus is frequently used in digital systems to interconnect a variety of devices included in the digital system. Generally, one or more devices are connected to the bus, and use the bus to communicate with other devices connected to the bus. As used herein, the term "agent" refers to a device which is capable of communicating on the bus. The agent may be a requesting agent if the agent is capable of initiating transactions on the bus and may be a responding agent if the agent is capable of responding to a transaction initiated by a requesting agent. A given agent may be capable of being both a requesting agent and a responding agent. Additionally, a "transaction" is a communication on the bus. The transaction may include an address transfer and optionally a data transfer. Transactions may be read transactions (transfers of data from the responding agent to the requesting agent) and write transactions (transfers of data from the requesting agent to the responding agent). Transactions may further include various coherency commands which may or may not involve a transfer of data.

The bus is a shared resource among the agents, and thus a mechanism for determining which agent is permitted to use the bus at any given time is needed. Generally, determining which of several agents is permitted to use the bus (often referred to as "mastering the bus") is referred to as "arbitration". An agent desiring to use the bus may signal its request to use the bus, referred to as "arbitrating". The circuitry for performing arbitration is referred to as an "arbiter". One or more agents may arbitrate for the bus, and the arbiter determines which of the arbitrating agents is permitted to use the bus. The agent granted use of the bus by the arbiter is referred to as the winner of the arbitration.

The rate at which the bus is able to carry transactions over a period of time is referred to as its bandwidth. Additionally, the bus may have a maximum sustainable bandwidth, which is a measure of the maximum bandwidth if the bus is used in the most efficient manner possible by the devices attached to the bus. The difference between the maximum theoretical bandwidth (which may be a function of bus width, clock frequency, and number of transfers per clock) and the maximum sustainable bandwidth may be due to protocol-related requirements such as, for example, dead cycles between transfers by different devices, limits as to the number of transactions that can be outstanding, etc.

The maximum sustainable bandwidth may not be achievable due to inefficiencies of the devices attached to the bus. For example, if a responding agent is incapable of handling a transaction initiated by a requesting agent, the transaction must somehow be delayed. Many buses employ a retry mechanism to handle such cases, in which the requesting agent initiates the transaction on the bus and the responding agent signals a retry for the transaction. The transaction is cancelled, and the requesting agent may attempt to initiated the transaction again at a later time.

Unfortunately, retry mechanisms make inefficient use of bus bandwidth. Bandwidth used to initiate the transaction each time it is retried is wasted, reducing the effective bus bandwidth. System performance may be reduced if the wasted bandwidth could have been used to perform other transactions. Furthermore, retry mechanisms increase the verification burden and increase the debugging complexity of the system, since the number of scenarios which may occur on the bus is multiplied by the number of times various transactions may be retried.

SUMMARY OF THE INVENTION

The problems outlined above are in large part solved by a system as disclosed herein. The system may include at least a first agent and a second agent, and the first agent may be coupled to receive a block signal generated by the second agent. The block signal is indicative of whether or not the second agent is capable of participating in transactions. The first agent initiates or inhibits initiation of a transaction for which the second agent is a participant responsive to the block signal. Since the source of the transaction (the first agent) does not initiate the transaction if a participant for the transaction is currently incapable of participating, a retry mechanism may not be needed. Instead, transactions which would otherwise be retried are not initiated. Bandwidth which would otherwise be wasted with a retried transaction may be conserved and used for other transactions which may complete.

In one implementation, the system may include additional agents. The agents may be configured to generate independent block signals. Thus, the determination of whether transactions are blocked or not blocked may be highly granular. Only those transactions for which a particular agent (asserting its block signal) is a participant may be blocked, while any transactions for which the particular agent is not a participant may not be blocked. Other implementations may share block signals among two or more agents. For example, a memory block signal indicative of memory transactions being blocked or not blocked and an input/output (I/O) block signal indicative of I/O transactions being blocked or not blocked may be employed. Agents which participate in memory transactions may be coupled to the memory block signal, and may assert the memory block signal to block memory transactions. Agents which participate in I/O transactions may be coupled to the I/O block signal, and may assert the I/O block signal to block I/O transactions. Such an implementation allows I/O transactions to be initiated when memory transactions are blocked and similarly allows memory transactions to be initiated when I/O transactions are blocked.

In yet another implementation, a first agent may provide separate block signals to other agents. The first agent may block one of the other agents from initiating transactions in which the first agent is a participant while permitting a second one of the other agents to initiate such transactions. Optimizations of transaction flow may be possible in such embodiments.

Broadly speaking, a system is contemplated. The system comprises a first agent and a second agent. The first agent is configured to generate a first signal, wherein the first signal is indicative, in a first state, that the first agent is available to participate in subsequent transactions, and wherein the first signal is indicative, in a second state, that the first agent is unavailable to participate in subsequent transactions. Coupled to receive the first signal, the second agent is configured to initiate a first transaction for which the first agent is a participant responsive to the first signal being in the first state, and wherein the second agent is configured to initiate a second transaction for which the first agent is a non-participant responsive to the first signal being in said second state.

Additionally, an agent is contemplated. The agent comprises a first storage location and a circuit coupled to the first storage location. The first storage location is configured to store a transaction to be initiated by the agent. The circuit is further coupled to receive a first signal indicative of whether or not a second agent is available to participate in transactions. The circuit is configured to selectively inhibit initiation of the transaction if the first signal indicates that the second agent is unavailable to participate in transactions, dependent on whether or not the second agent is a participant in the transaction.

Moreover, a method is contemplated. A first signal indicative of whether or not a first agent is available to participate in transactions is received. Initiation of a transaction is selectively inhibited if the first signal indicates that the first agent is unavailable to participate in transactions, dependent on whether or not the first agent is a participant in the transaction.

BRIEF DESCRIPTION OF THE DRAWINGS

Other objects and advantages of the invention will become apparent upon reading the following detailed description and upon reference to the accompanying drawings in which.

Figure 1:
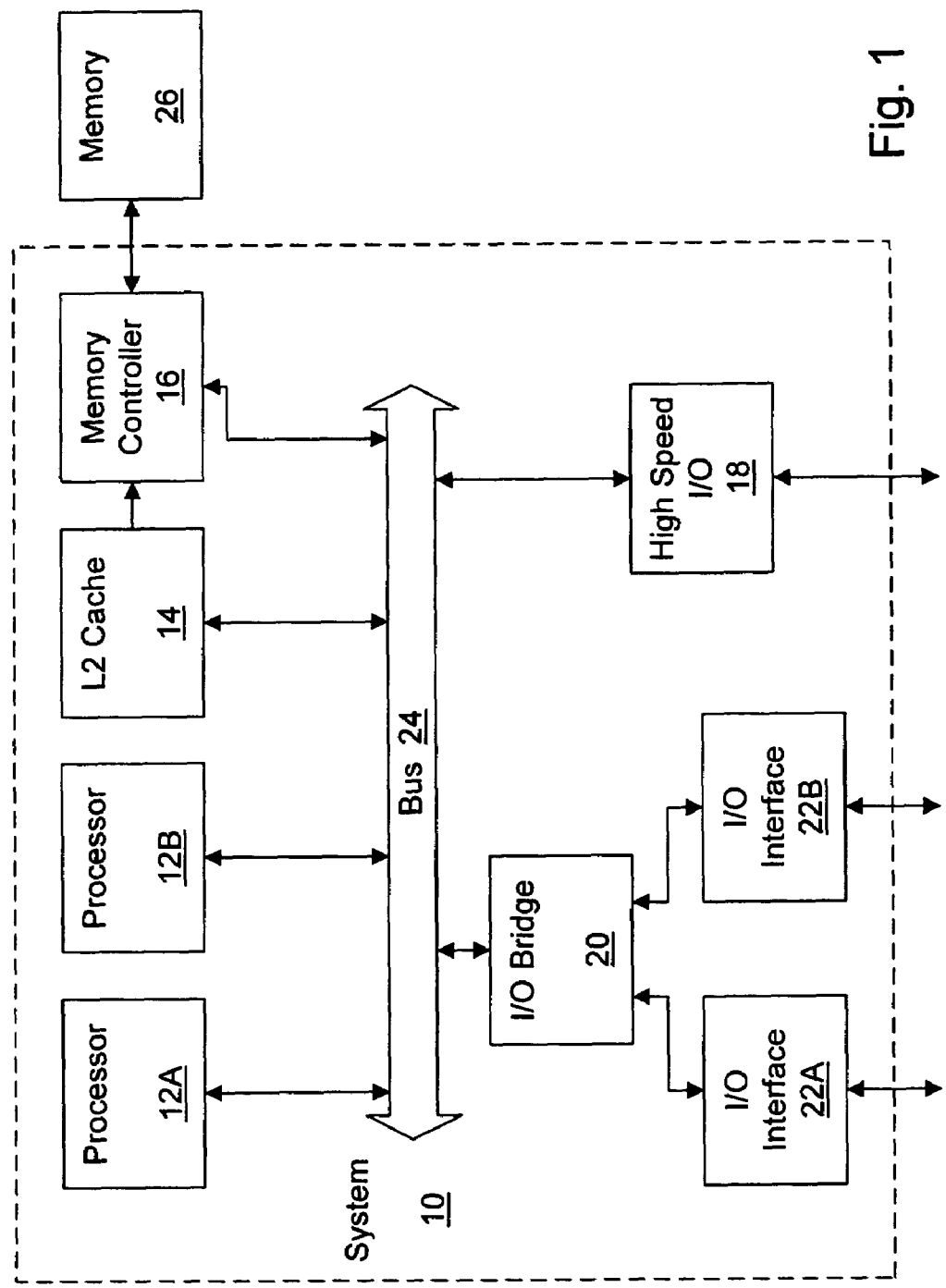
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

System Overview

Turning now to FIG. 1, a block diagram of one embodiment of a system 10 is shown. Other embodiments are possible and contemplated. In the embodiment of FIG. 1, system 10 includes processors 12A–12B, an L2 cache 14, a memory controller 16, a high speed input/output (I/O) bridge 18, an I/O bridge 20, and I/O interfaces 22A–22B. System 10 may include a bus 24 for interconnecting the various components of system 10. As illustrated in FIG. 1, each of processors 12A–12B, L2 cache 14, memory controller 16, high speed I/O bridge 18 and I/O bridge 20 are coupled to bus 24. I/O bridge 20 is coupled to I/O interfaces 22A–22B. L2 cache 14 is coupled to memory controller 16, which is further coupled to a memory 26.

Generally, processors 12A–12B and/or the I/O bridges/interfaces may initiate transactions on the bus 24. System 10 supports various types of transactions on bus 24. Memory transactions are transactions which target a memory location. Additionally, system 10 supports I/O transactions which target an I/O device (e.g. a device coupled through I/O bridge 18, or I/O bridge 20 and one of I/O interfaces 22A–22B, to bus 24). Any of processors 12A–12B, L2 cache 14, memory controller 16, I/O bridge 20, or I/O bridge 18 may be a participant in the transactions. Generally, an agent "participates" in a transaction if the agent is required to take action during the transaction in order for the transaction to complete properly. The agent "does not participate" in a transaction if the agent is not required to take any action during the transaction in order for the transaction to complete properly. Similarly, the agent is a "participant" in the transaction if the agent is required to take action during the transaction in order for the transaction to complete properly. An agent is referred to as a participant in a particular transaction even if that transaction has not yet been initiated on bus 24, if that agent would take action during the particular transaction when that particular transaction is performed. The agent is a "non-participant" in the transaction if the agent is not required to take any action during the transaction in order for the transaction to complete properly. An agent is referred to as a non-participant in a particular transaction even if that transaction has not yet been initiated on bus 24, if that agent would not take action during the particular transaction when that particular transaction is performed. The agent targeted by the transaction participates in the transaction. Additionally, other agents may participate in various transactions. For example, processors 12A–12B may participate in coherent memory transactions by taking action to ensure coherency (e.g. snooping internal caches and indicating the result of the snoop). L2 cache 14 may participate in cacheable memory transactions by determining if the transaction is a hit and providing the data or updating the data stored therein in response to the transaction. As used herein, the term "snoop" or "snooping" refers to checking a cache to determine if data corresponding to a memory location affected by a transaction is present in the cache, and signalling the state of the data to ensure that coherency of the data is maintained.

An addressable range of system 10 is defined by the size of the addresses which may be transmitted on bus 24. The addressable range may be divided into several address spaces including a memory address space and various I/O address spaces. In this embodiment, the address space which includes the address of a transaction may identify the type of the transaction. Thus, an address within the memory address space indicates that the transaction is a memory transaction and the address identifies a targeted memory location in memory 26 (and thus memory controller 16 and L2 cache 14 may respond to the transaction, and processors 12A–12B may participate in the transaction by snooping). An address within the I/O address spaces indicates that the transaction is an I/O transaction and the address targets an I/O device on one of the I/O interfaces. Each of the I/O address spaces may be assigned to one of I/O bridge 20 or I/O bridge 18.

While address spaces are used to determine which type of transaction is being performed (and the target of the transaction), other embodiments may determine these attributes in other ways. For example, different instructions may be used to cause different types of transactions or to target different devices.

Processors 12A–12B may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture.

L2 cache 14 is a high speed cache memory. L2 cache 14 is referred to as "L2" since processors 12A–12B may employ internal level 1 ("L1") caches. If L1 caches are not included in processors 12A–12B, L2 cache 14 may be an L1 cache. Furthermore, if multiple levels of caching are included in processors 12A–12B, L2 cache 14 may be a lower level cache than L2. L2 cache may employ any organization, including direct mapped, set associative, and fully associative organizations. In one particular implementation, L2 cache 14 may be a 512 kilobyte, 4 way set associative cache having 32 byte cache lines. A set associative cache is a cache arranged into multiple sets, each set comprising two or more entries. A portion of the address (the "index") is used to select one of the sets (i.e. each encoding of the index selects a different set). The entries in the selected set are eligible to store the cache line accessed by the address. Each of the entries within the set is referred to as a "way" of the set. The portion of the address remaining after removing the index (and the offset within the cache line) is referred to as the "tag", and is stored in each entry to identify the cache line in that entry. The stored tags are compared to the corresponding tag portion of the address of a memory transaction to determine if the memory transaction hits or misses in the cache, and is used to select the way in which the hit is detected (if a hit is detected).

Memory controller 16 is configured to access memory 26 in response to memory transactions received on bus 24. Memory controller 16 receives a hit signal from L2 cache 14, and if a hit is detected in L2 cache 14 for a memory transaction, memory controller 16 does not respond to that memory transaction. If a miss is detected by L2 cache 14, or the memory transaction is non-cacheable, memory controller 16 may access memory 26 to perform the read or write operation. Memory controller 16 may be designed to access any of a variety of types of memory. For example, memory controller 16 may be designed for synchronous dynamic random access memory (SDRAM), and more particularly double data rate (DDR) SDRAM. Alternatively, memory controller 16 may be designed for DRAM, Rambus DRAM (RDRAM), SRAM, or any other suitable memory device.

High speed I/O bridge 18 may be an interface to a high speed I/O interconnect. For example, high speed I/O bridge 18 may implement the Lightning Data Transport (LDT) I/O fabric developed by Advanced Micro Devices, Inc. Other high speed interfaces may be alternatively used.

I/O bridge 20 is used to link one or more I/O interfaces (e.g. I/O interfaces 22A– 22B) to bus 24. I/O bridge 20 may serve to reduce the electrical loading on bus 24 if more than one I/O interface 22A–22B is bridged by I/O bridge 20.

Generally, I/O bridge 20 performs transactions on bus 24 on behalf of I/O interfaces 22A–22B and relays transactions targeted at an I/O interface 22A–22B from bus 24 to that I/O interface 22A–22B. I/O interfaces 22A–22B may be lower bandwidth, higher latency interfaces. For example, I/O interfaces 22A–22B may include one or more serial interfaces, Personal Computer Memory Card International Association (PCMCIA) interfaces, Ethernet interfaces (e.g. media access control level interfaces), Peripheral Component Interconnect (PCI) interfaces, etc.

Bus 24 may have any suitable protocol and construction. According to one implementation, bus 24 may be a split transaction bus. The implementation may include an address bus supporting up to 40 bits of addressable range and a data bus capable of transmitting one cache line per clock cycle (e.g. 32 bytes). Other widths for either the address bus or data bus are possible and contemplated. The bus may also include transactions to support maintaining memory coherency (e.g. an invalidate command). The bus may use any suitable signalling technique (e.g. differential or non-differential signalling).

It is noted that system 10 (and more particularly processors 12A–12B, L2 cache 14, memory controller 16, I/O interfaces 18 and 22A–22B, I/O bridge 20, and bus 24 may be integrated onto a single integrated circuit as a system on a chip configuration. In another configuration, memory 26 may be integrated as well. Alternatively, one or more of the components may be implemented as separate integrated circuits, or all components may be separate integrated circuits, as desired. Any level of integration may be used.

As used herein, a transaction "targets" a location or device if the location or device is the provider of data for the transaction (for a read transaction) or receiver of data for the transaction (for a write transaction). Viewed in another way, a transaction may target a location or device if the address of the transaction is mapped to that location or device. Thus, for bus 24, a transaction may target one of memory controller 16, I/O bridge 20, or high speed I/O bridge 18.

Source Blocking Based on Participating Agents

Figure 2:
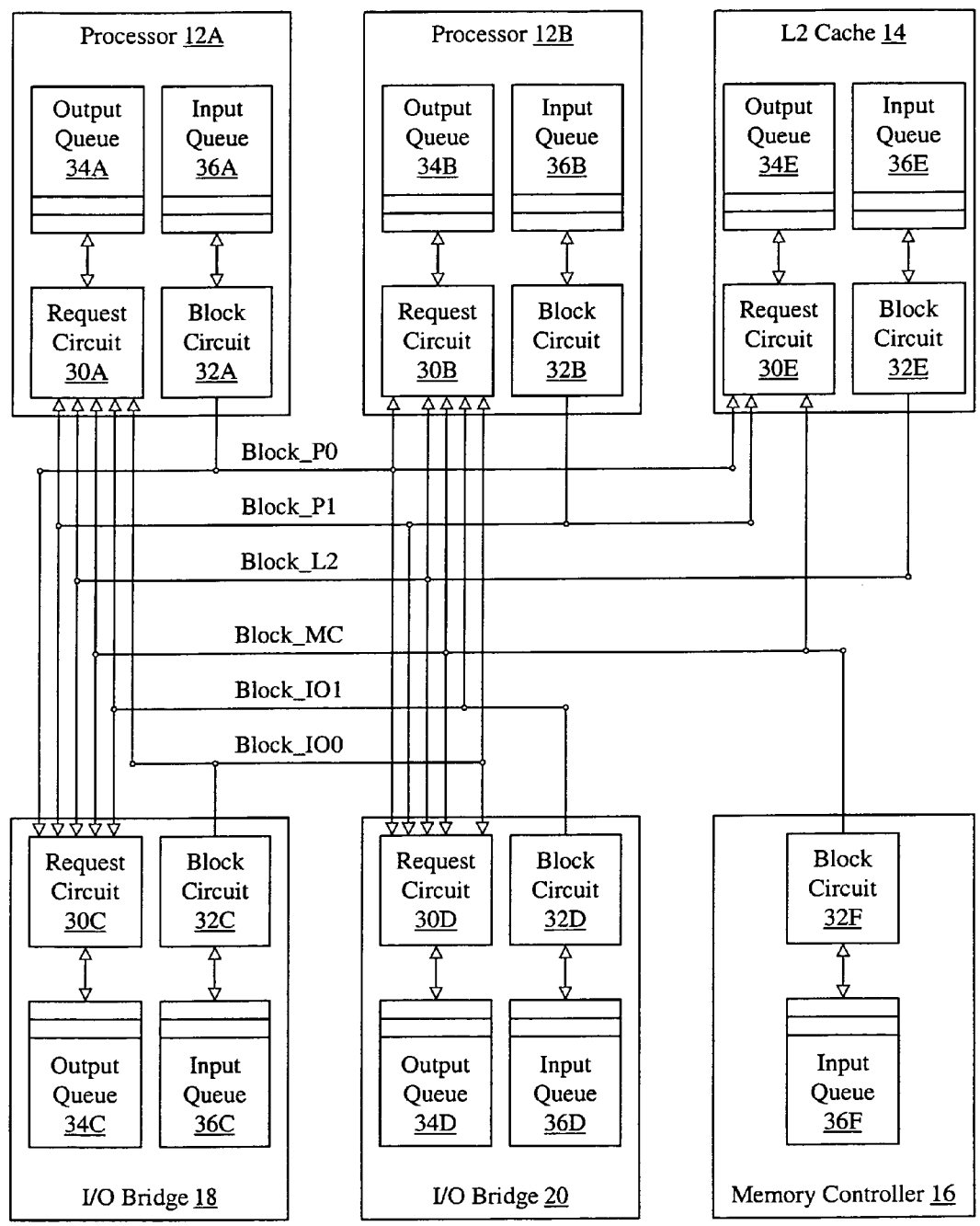
FIG. 2 is a block diagram of the agents shown in FIG. 1, highlighting one embodiment of the interconnect therebetween.

Turning now to FIG. 2, a block diagram illustrating additional details of one embodiment of processors 12A–12B, L2 cache 14, memory controller 16, and I/O bridges 18 and 20 is shown. FIG. 2 also illustrates one embodiment of certain interconnect between the above agents. Other embodiments are possible and contemplated. In the embodiment of FIG. 2, processor 12A includes a request circuit 30A, a block circuit 32A, an output queue 34A and an input queue 36A. Request circuit 30A is coupled to receive a block signal from each other agent on bus 24, and is coupled to output queue 34A. Block circuit 32A is coupled to input queue 36A and is configured to generate a Block_P0 signal. Processor 12B includes a similar set of elements including request circuit 30B, block circuit 32B, output queue 34B, and input queue 36B. I/O bridges 18 and 20 are also similarly configured, including request circuit 30C, block circuit 32C, output queue 34C and input queue 36C within I/O bridge 18 and request circuit 30D, block circuit 32D, output queue 34D and input queue 36D within I/O bridge 20. L2 cache 14 may also be similarly configured, including a request circuit 30E, a block circuit 32E, an output queue 34E, and an input queue 36E. Memory controller 16 includes a block circuit 32F and an input queue 36F.

Generally, each agent captures the transactions for which that agent is a participant. The transaction are captured in that agent's input queue 36A–36F. The agent may remove the transaction from its input queue 36A–36F to process the transaction. Each input queue 36A–36F may be sized (i.e. the number of entries determined) based on the expected latency for processing the transactions in the participating agent and the number of additional transactions expected during that latency period, etc. It is typically not desirable to provide a queue having enough entries to store the maximum number of transactions which might occur, since frequently many of the queue entries would go unused and thus would be wasteful of circuit area in the agent. Accordingly, the input queues may be sized for the most likely number of transactions during ordinary transaction sequences, and the queue may become full in some cases. For example, I/O transactions tend to be longer latency than memory transactions, but also tend to occur less frequently. Thus, input queues 36C and 36D may include relatively few entries. On the other hand, lower-latency memory transactions may occur much more frequently and thus input queues 36A–36B and 36E–36F may include a larger number of entries. Any of the input queues 36A–36F may become full, however, and thus the agent including the full input queue may be incapable of participating in additional transactions until input queue entries are free to store additional transactions.

Block circuits 32A–32F are provided to determine if the corresponding input queue 36A–36F is becoming full, and to generate a block signal if the corresponding input queue 36A–36F is becoming full. In the illustrated embodiment, each block circuit 32A–32F generates a separate block signal, as follows: Block circuit 32A generates Block_P0; block circuit 32B generates Block_P1; block circuit 32C generates Block_IO0; block circuit 32D generates Block_IO1; block circuit 32E generates Block_L2; and block circuit 32F generates Block_MC. The block signal may be asserted to indicate that the corresponding agent is unavailable to participate in additional transactions, and deasserted to indicate that the corresponding agent is available to participate in additional transactions.

Each requesting agent (e.g. processors 12A–12B, I/O bridges 18 and 20, and L2 cache 14) includes a request circuit 30A–30E, which receives the block signals, and an output queue 34A–34E. The requesting agent may queue transactions to be initiated on bus 24 in the corresponding output queue 34A–34E. Request circuits 30A–30E are coupled to the respective output queues 34A–34E, and determine if the corresponding agent is allowed to initiate transactions from the respective output queue onto bus 24 responsive to the block signals. More particularly, the request circuit 30A–30E blocks the initiation of a first transaction in the corresponding output queue 34A–34E if any agent which is a participant in the first transaction is asserting its block signal. Thus, the source of each transaction may selectively block or not block initiation of the transaction dependent on whether or not the other participant(s) in the transaction is(are) currently able to participate. In the illustrated embodiment, L2 cache 14 may be a requesting agent for memory space transactions only, and thus may receive only those signals used for memory transactions (e.g. Block_P0, Block_P1, and Block_MC). Other embodiments may include the Block_IO0 and Block_IO1 signals as well (e.g. if the I/O bridges may temporarily cache data and thus may snoop memory transactions).

In this manner, transactions which cannot be completed due to a participating agent being incapable of participating are not initiated on bus 24. Accordingly, a retry mechanism is not required for this purpose. Furthermore, the bandwidth which would otherwise be wasted for initiation of the transaction (which is then subsequently retried) may be used for a transaction which can be completed. The effective bandwidth of the bus may thus be increased.

On the other hand, transactions for which no participant is asserting a block signal are allowed to be initiated on bus 24. In other words, a given transaction is not blocked by an agent which is a non-participant in that transaction. Thus, due to the granularity of the blocking (e.g. each agent independently indicating its ability to participate), transactions may be performed even though a non-participating agent is blocking transactions.

Request circuits 30A–30E may block initiation of transactions in a number of ways. For example, if a block signal for a participating agent is asserted before the corresponding agent wins arbitration of bus 24 to perform the blocked transaction, request circuits 30A–30E may inhibit arbitration (or further arbitration) to perform the blocked transaction until the block signal is deasserted. The corresponding agent may arbitrate to perform other, non-blocked transactions, if desired. On the other hand, if the block signal is not asserted before the corresponding agent wins arbitration, the request circuit 30A–30E may cause the agent to drive an invalid command encoding on the bus. In this case, the bandwidth is not conserved, but the transaction is not performed and thus no need to retry the transaction occurs.

As mentioned above, a block circuit 32A–32F may assert the corresponding block signal if the corresponding input queue 36A–36F is becoming full. More particularly, the block circuit 32A–32F may assert the corresponding block signal if the number of free (currently unused) entries falls to a predetermined threshold. The threshold may be zero, if the block signal can be generated soon enough to block any subsequent transaction that may require participation by the corresponding agent. However, in one embodiment, arbitration and transaction initiation are pipelined. Thus, the initiation of a transaction which would fill the last free input queue entry may occur in parallel with the arbitration for a transaction which would also require an input queue entry in that agent. Accordingly, in such an embodiment, the threshold may be one. In response to a transaction which fills the second to last free queue entry, leaving one free queue entry, the corresponding block circuit 32A–32F asserts its block signal.

It is noted that each of input queues 36A–36F may include a suitable number of entries, and may differ from the number of entries in other input queues 36A–36F. Similarly, each of output queues 34A–34E may include a suitable number of entries, and may differ from the number of entries in other output queues 34A–34E. Furthermore, the above discussion refers to the assertion and deassertion of signals. A signal may be defined to be asserted in a high or low state. The signal may be defined to be deasserted in the opposite state. Furthermore, the signals may be differential, and the assertion and deassertion may be determined based on the differential signalling (e.g. from the difference between a differential pair of signals).

It is further noted that, while the above description refers to input queue full scenarios as a reason for being unavailable to participate in additional transactions, a given agent may have other reasons for being unavailable to participate in additional transactions, as desired. The block signals may be used as described above for such scenarios as well.

Figure 3:
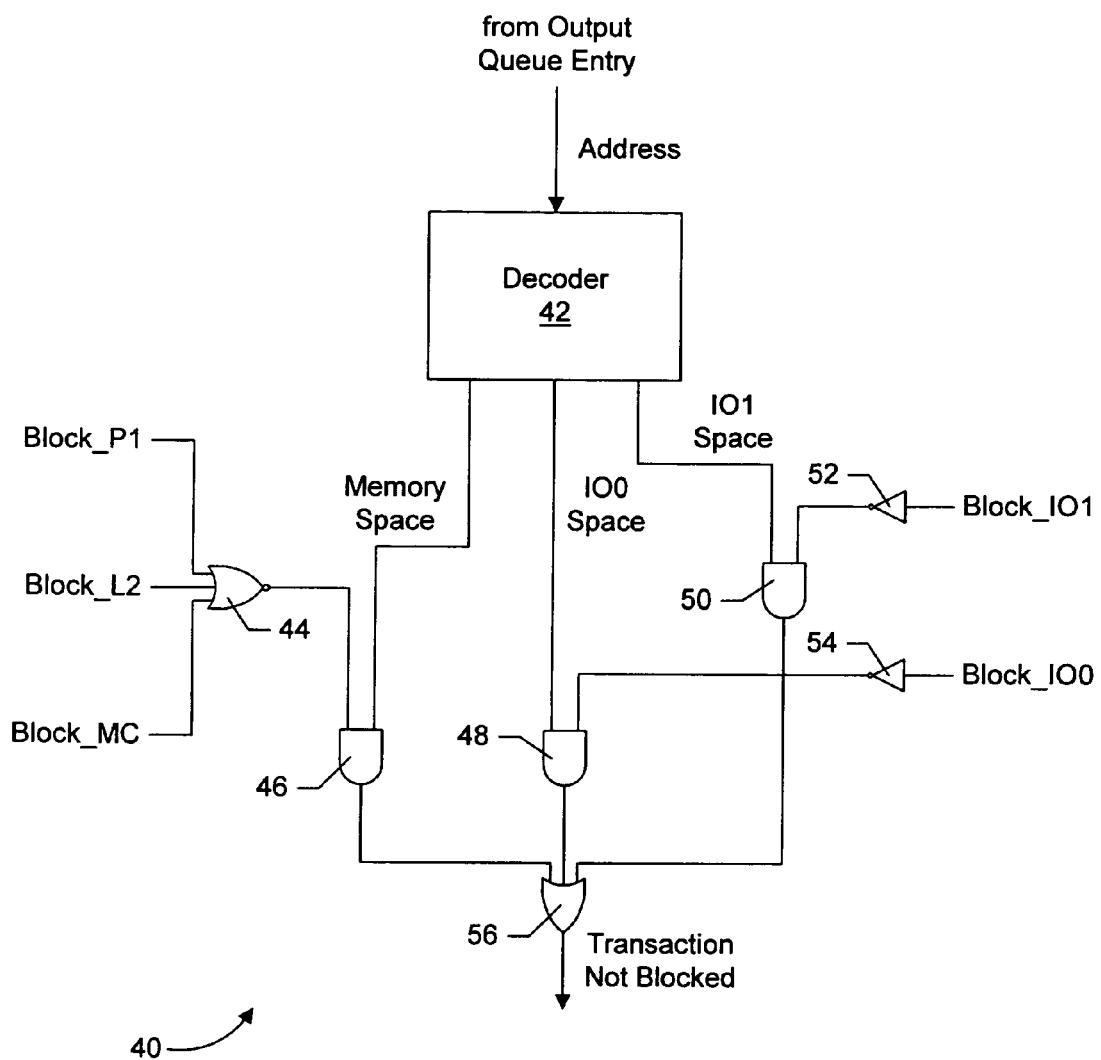
FIG. 3 is a block diagram of one embodiment of a circuit which may be included in one embodiment of a request circuit shown in FIG. 2.

Turning next to FIG. 3, a block diagram of a circuit 40 is shown. Circuit 40 may form a portion of one embodiment of request circuit 30A. More particularly, circuit 40 may be configured to determine if the transaction in one output queue entry of output queue 34A is blocked or not blocked.

Additional copies of circuit 40 may be included for other output queue entries. Other embodiments are possible and contemplated. In the embodiment of FIG. 3, circuit 40 includes a decoder 42 and logic gates 44, 46, 48, 50, 52, 54, and 56. Decoder 42 is coupled to receive at least a portion of the address of the transaction from the output queue entry, and is coupled to logic gates 46, 48, and 50. The remaining logic gates are coupled as illustrated in FIG. 3.

As mentioned above with respect to FIG. 1, the addressable range of system 10 is divided into various address spaces. More particularly, a memory address space defining addresses which identify memory locations in memory 26 is defined. Additionally, various I/O address spaces are defined for the I/O interfaces 22A–22B, and an I/O address space is defined for the I/O interface to which I/O bridge 18 is coupled. The address spaces include at least one address range, and may include two or more disjoint address ranges within the addressable range. Accordingly, decoder 42 decodes the address of the transaction in the output queue entry (or at least the portion of the address used to distinguish between address spaces) to determine if the transaction is a memory transaction, an I/O transaction involving an I/O interface coupled to I/O bridge 18, or an I/O transaction involving an I/O interface coupled to I/O bridge 20. Decoder 42 asserts one of the output signals illustrated in FIG. 3 based on the address decode: the memory space signal if the transaction is a memory transaction, the IO0 space signal if the transaction is an I/O transaction involving an I/O interface coupled to I/O bridge 18, and the IO1 space signal if the transaction is an I/O transaction involving an I/O interface coupled to I/O bridge 20.

Each of AND gates 46, 48, and 50 combine a respective one of the memory space, IO0 space, and IO1 space signals with a signal indicating whether or not transactions to that space are blocked. The outputs of AND gates 46, 48, and 50 are ORed by OR gate 56 to produce a signal indicating whether or not the transaction is blocked. More particularly the signal output from OR gate 56 is a logical one if the transaction is not blocked and a logical zero if the transaction is blocked.

Memory space transactions may be blocked if any of the Block_P1 signal, Block_L2 signal, or Block_MC signal is asserted. Processor 12B, corresponding to the Block_P1 signal, participates in cacheable memory transactions by snooping its internal cache. L2 cache 14, corresponding to the Block_L2 signal, participates in cacheable memory transactions by determining if the transaction is a hit and providing data for a hit with lower latency. Memory controller 16, corresponding to the Block_MC signal, is the target of a memory transaction. Thus, NOR gate 44 combines the Block_P1, Block_L2, and Block_MC signals to produce a signal for AND gate 46. NOR gate 44 provides a logical zero if any of the Block_P1, Block_L2, and Block_MC signals are asserted, thus preventing a logical one (not blocked) output of OR gate 56 if the transaction is a memory space transaction.

In the illustrated embodiment, the only participants in I/O transactions besides the initiator is the targeted I/O bridge 18 or 20. Thus, inverters 52 and 54 invert the Block_IO1 signal and the Block_IO0 signal, respectively, and provide inputs to AND gates 50 and 48, respectively. Thus, assertion of the Block_IO1 signal prevents a logical one (not blocked) output signal from OR gate 56 for IO1 space transactions. Similarly, assertion of the Block_IO0 signal prevents a logical one (not blocked) output signal from OR gate 56 for IO0 space transactions.

Request circuit 30A may use the transaction not blocked output signal from circuit 40 (and similar signals from similar circuits which correspond to other output queue entries) to determine if processor 12A may arbitrate for bus 24. More particularly, if the transaction in the output queue entry corresponding to circuit 40 is not blocked and is eligible for initiation, processor 12A may arbitrate. If the transaction is blocked, processor 12A may not arbitrate unless another transaction which is eligible for initiation is not blocked. A transaction may be eligible for initiation if it is the oldest transaction in the output queue, or if there are no other reasons (e.g. ordering constraints with older transactions, resource conflicts, etc.) why the transaction cannot be initiated even though there are older transactions. In addition to using the transaction not blocked output signal to determine if processor 12A may arbitrate for bus 24, request circuit 30A may use the transaction not blocked output signal (in a logical zero state) to cause an invalid transaction to be initiated on bus 24 (e.g. by driving an invalid command encoding) if processor 12A wins arbitration for bus 24 and is to initiate the transaction in the output queue entry corresponding to circuit 40.

It is noted that, while the circuit 40 illustrated in FIG. 3 includes specific logic gates, any suitable circuitry may be used. Specifically, all Boolean equivalents of the circuit shown in FIG. 3 may be used. Furthermore, circuitry which produces a transaction blocked signal (the logical inverse of the transaction not blocked signal) may be used as another alternative. Still further, other logic circuits may be suitable depending upon which state of the various signals is defined to be asserted and which state is defined to be deasserted.

It is noted that circuits similar to circuit 40 may be used for other request circuits 30B–30E. For example, a circuit for request circuit 30B may be the same as circuit 40 except that the Block_P1 signal is replaced by the Block_P0 signal. Thus, during an arbitration that processor 12A is blocked from arbitrating for a memory transaction due to Block_P1 being asserted, processor 12B may not be blocked from arbitrating for a memory transaction if none of the Block_P1, Block_MC, or Block_L2 signals are asserted. A circuit for request circuit 30C may include both Block_P0 and Block_P1 inputs to NOR gate 44 (as well as the Block_MC and Block_L2 inputs) and may exclude the circuitry for the IO0 space. Similarly, a circuit for request circuit 30D may include both Block_P0 and Block_P1 inputs to NOR gate 44 (as well as the Block_MC and Block_L2 inputs) and may exclude the circuitry for the IO1 space.

Figure 4:
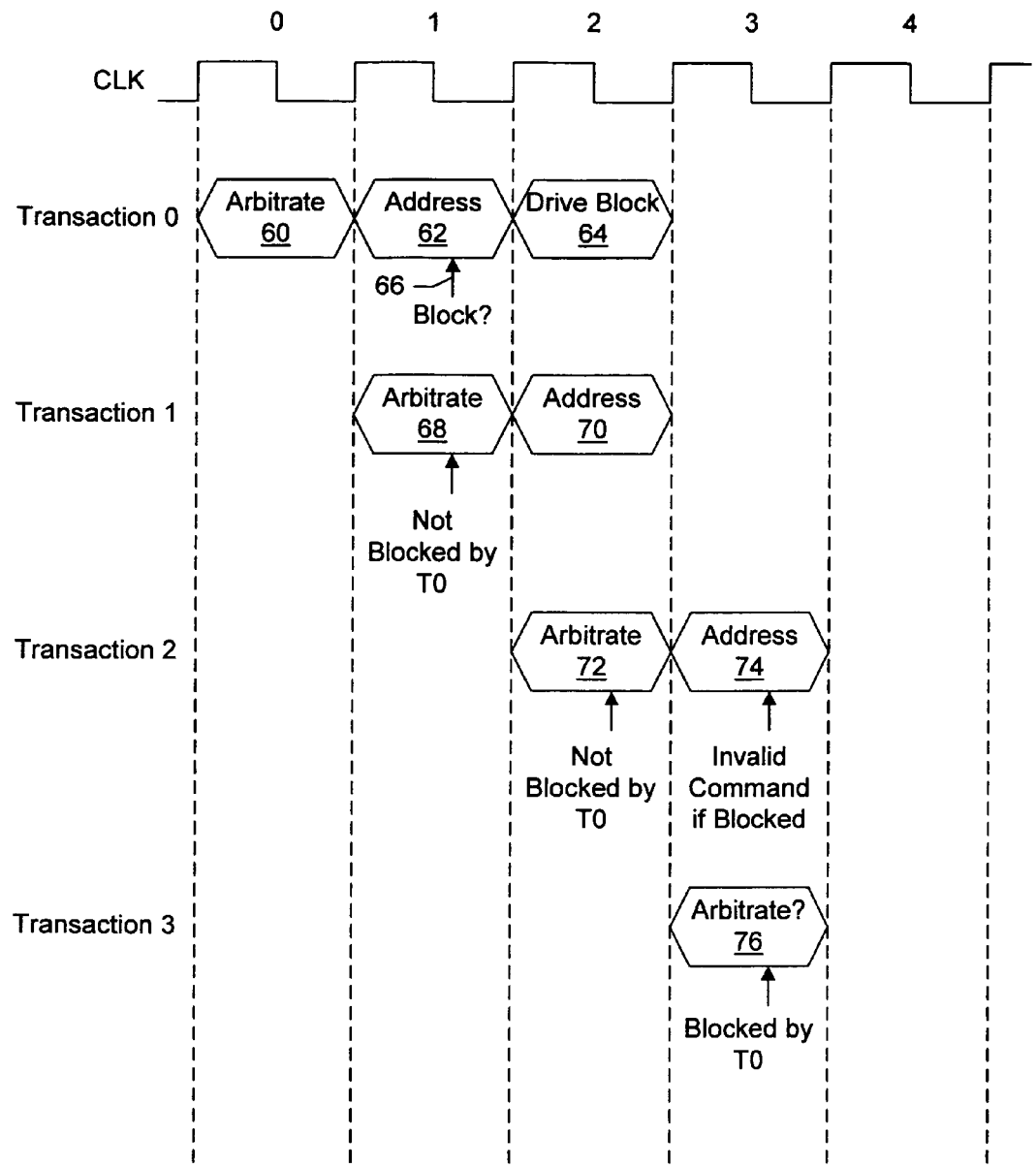
FIG. 4 is a timing diagram illustrating transactions and the effect of a block signal on the transactions.

Turning now to FIG. 4, a timing diagram illustrating several transactions according to one embodiment of bus 24. Other embodiments are possible and contemplated. In the embodiment of FIG. 4, several clock cycles are shown, delimited by vertical dashed lines. Each clock cycle is labeled at the top (0–4). The clock signal used to clock bus 24 is shown (CLK).

FIG. 4 illustrates a transaction 0 which may cause a block signal to be asserted by an agent and several subsequent transactions. Transaction 0 includes an arbitration 60 in clock cycle 0, an address phase 62 in clock cycle 1, and the driving of a block signal in clock cycle 2 (reference numeral 64). In the present embodiment, signals may be driven by an agent responsive to the rising edge of the clock signal (CLK) and sampled by receiving agents responsive to the falling edge of the clock signal. Thus, after the falling edge of the clock signal in clock cycle 1, an agent may determine if it is a participant in transaction 0. If the agent is a participant, it may determine if transaction 0 being placed in its input queue causes the agent to assert its block signal (illustrated by arrow 66 in FIG. 4). If the agent determines that the block signal should be asserted, the agent drives the block signal in clock cycle 2. Other agents sample the block signal responsive to the falling edge of the clock signal in clock cycle 2.

A second transaction (transaction 1) is illustrated with an arbitration in clock cycle 1 (reference numeral 68) and an address phase in clock cycle 2 (reference numeral 70). Since the arbitration 68 occurs prior to the assertion of the block signal in response to transaction 0, the arbitration is not affected by that block signal. Similarly, since the address phase 70 is driven coincident with the block signal, the address phase 70 is also unaffected by the block signal (since the agent driving the address samples the block signal at the falling edge of the CLK signal in clock cycle 2, after driving the address). Accordingly, if the agent driving the block signal in response to transaction 0 is a participant in transaction 1, that agent must capture transaction 1.

Transaction 2 includes an arbitration in clock cycle 2 and an address phase in clock cycle 3 (reference numerals 72 and 74, respectively). The arbitration 72 occurs coincident with the driving of the block signal in response to transaction 0. Thus, since the arbitrating agents drive their arbitration signals at the beginning of clock cycle 2, the arbitration for transaction 2 is not affected by the block signal. However, the arbitration winner for transaction 2 may use the assertion of the block signal to drive an invalid transaction during clock cycle 3. Accordingly, transaction 2 can be blocked by the assertion of a block signal in response to transaction 0. Finally, transaction 3 includes an arbitration 76 in clock cycle 3, which may be inhibited if the transaction is blocked via the block signal corresponding to transaction 0.

As FIG. 4 illustrates, an agent asserting a block signal in response to transaction 0 may block transaction 2 or transaction 3, but may not block transaction 1. Thus, for the embodiment of FIG. 4, agents may assert the block signal in response to a transaction if the transaction leaves one or fewer input queue entries free for other transactions. If transaction 0 causes assertion of the block signal, the remaining queue entry may be used for transaction 1 if that agent participates in transaction 1.

Figure 5:
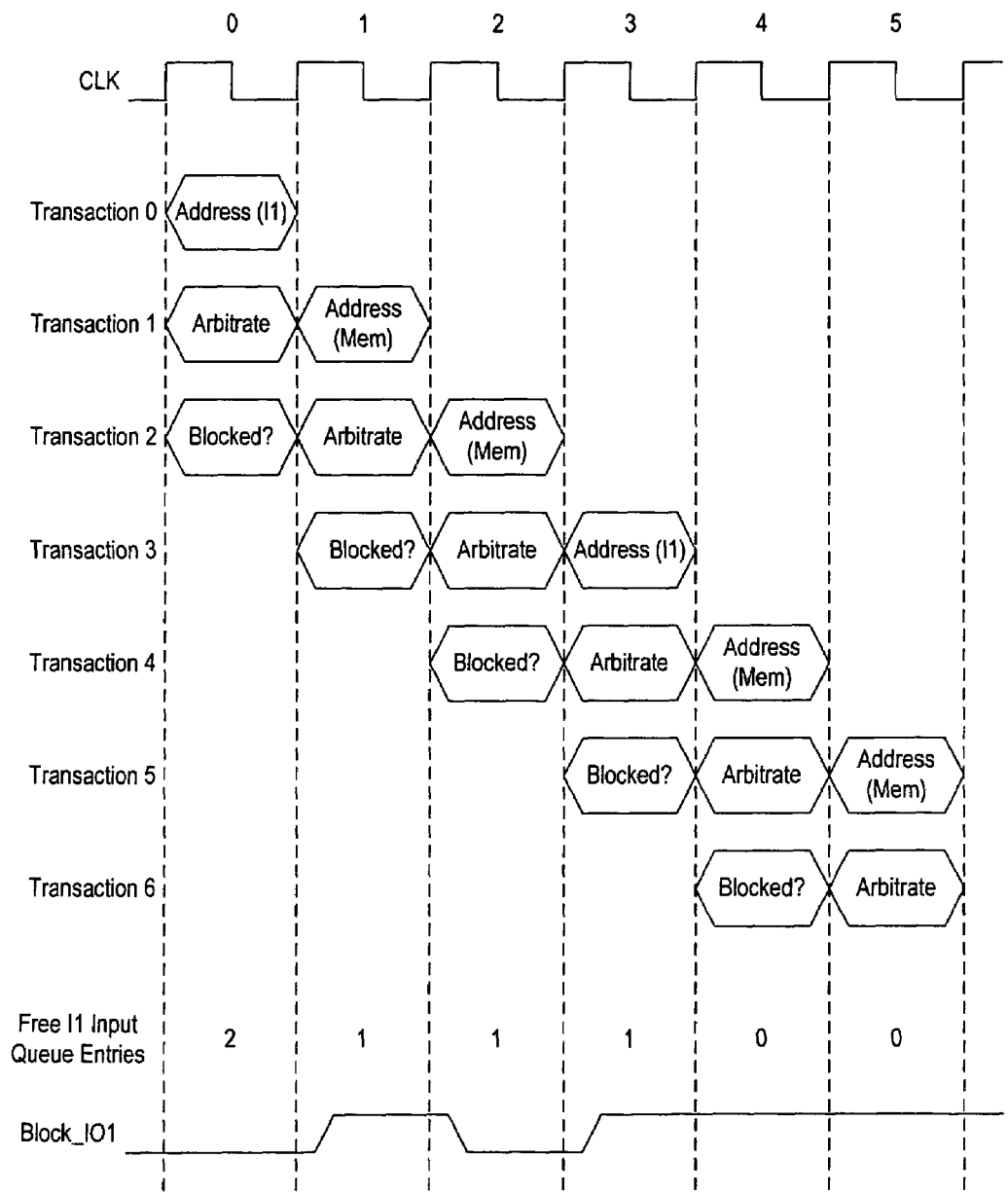
FIG. 5 is a timing diagram illustrating an optional method of using the block signal.

Turning now to FIG. 5, a timing diagram is shown illustrating an optional optimization of the use of the block signals. Other embodiments are possible and contemplated. In the embodiment of FIG. 5, several clock cycles are shown, delimited by vertical dashed lines. Each clock cycle is labeled at the top (0–5). The clock signal used to clock bus 24 is shown (CLK).

The example of FIG. 5 illustrates the block signal for I/O bridge 20 (Block_IO1) and the number of free input queue entries for input queue 36D, both as a function of the transactions 0 through 6 illustrated in FIG. 5. During clock cycle 0, the address phase of transaction 0 occurs and is targeted at I/O bridge 20. Accordingly, during clock cycle 1, the number of free input queue entries in I/O bridge 20 is reduced by 1, to one. Since the number of entries is one or less, the Block_IO1 signal is also asserted during clock cycle 1.

Transaction 1 is a memory transaction in the example. Accordingly, transaction 1 does not fill the remaining input queue entry in I/O bridge 20. If the Block_IO1 signal were asserted and remained asserted from clock cycle 1 until the number of free input queue entries were increased back to 2, the remaining input queue entry would be less fully utilized than it could be. Accordingly, to attempt to better use the last input queue entry, agents may be configured to assert their block signals every other clock cycle while one input queue entry remains free. Request circuits 30A–30E may be configured to detect the oscillating pattern of the block signal and may allow a transaction which would otherwise be blocked to proceed. Alternatively, if bus 24 includes a bus parking feature in which arbitration may be skipped if the no other agent is granted the bus subsequent to a parked agent being granted the bus, the parked agent may transmit another transaction during a clock cycle in which the block signal is not asserted (thus filling the remaining input queue entry). Once the remaining input queue entry is filled, the corresponding block signal may be asserted every clock cycle until an input queue entry is freed (by processing a transaction from the input queue).

Transactions 2 through 6 are also illustrated in FIG. 5. Each transaction includes a determination by the requesting agent of whether or not the transaction is blocked prior to arbitration, an arbitration, and an address phase. Transaction 2 is a memory transaction, and thus is not blocked by the Block_IO1 signal assertion in clock cycle 1.

Transaction 3 is an I/O transaction targeting I/O bridge 20. During clock cycle 1, the requesting agent for transaction 3 detects that the Block_IO1 signal is asserted. For the optimization illustrated in FIG. 5, however, the requesting agent considers two consecutive clock cycles of the block signals to determine if arbitration to perform a potentially blocked transaction is allowed. Particularly, arbitration is allowed in the next clock cycle if the block signal is deasserted in at least one of the current clock cycle and the preceding clock cycle. If the block signal is then deasserted during the clock cycle that arbitration is won by the requesting agent, the transaction is not blocked. On the other hand, if the block signal is asserted during the clock cycle that arbitration is won, the potentially blocked transaction is blocked and may not be performed. Either another transaction may be performed, or an invalid cycle may be driven on the bus. In the example of FIG. 5, the Block_IO1 signal is asserted in clock cycle 1 but was deasserted in clock cycle 0. Thus, the requesting agent arbitrates for the bus in clock cycle 2 to perform transaction 3. Since the Block_IO1 signal is deasserted in clock cycle 2, the requesting agent drives the transaction 3 in clock cycle 3. During clock cycle 4, the number of free input queue entries is zero and the Block_IO1 signal is asserted. The Block_IO1 signal may remain asserted each clock cycle until the number of free input queue entries increases through the processing of transactions in the input queues.

Figure 6:
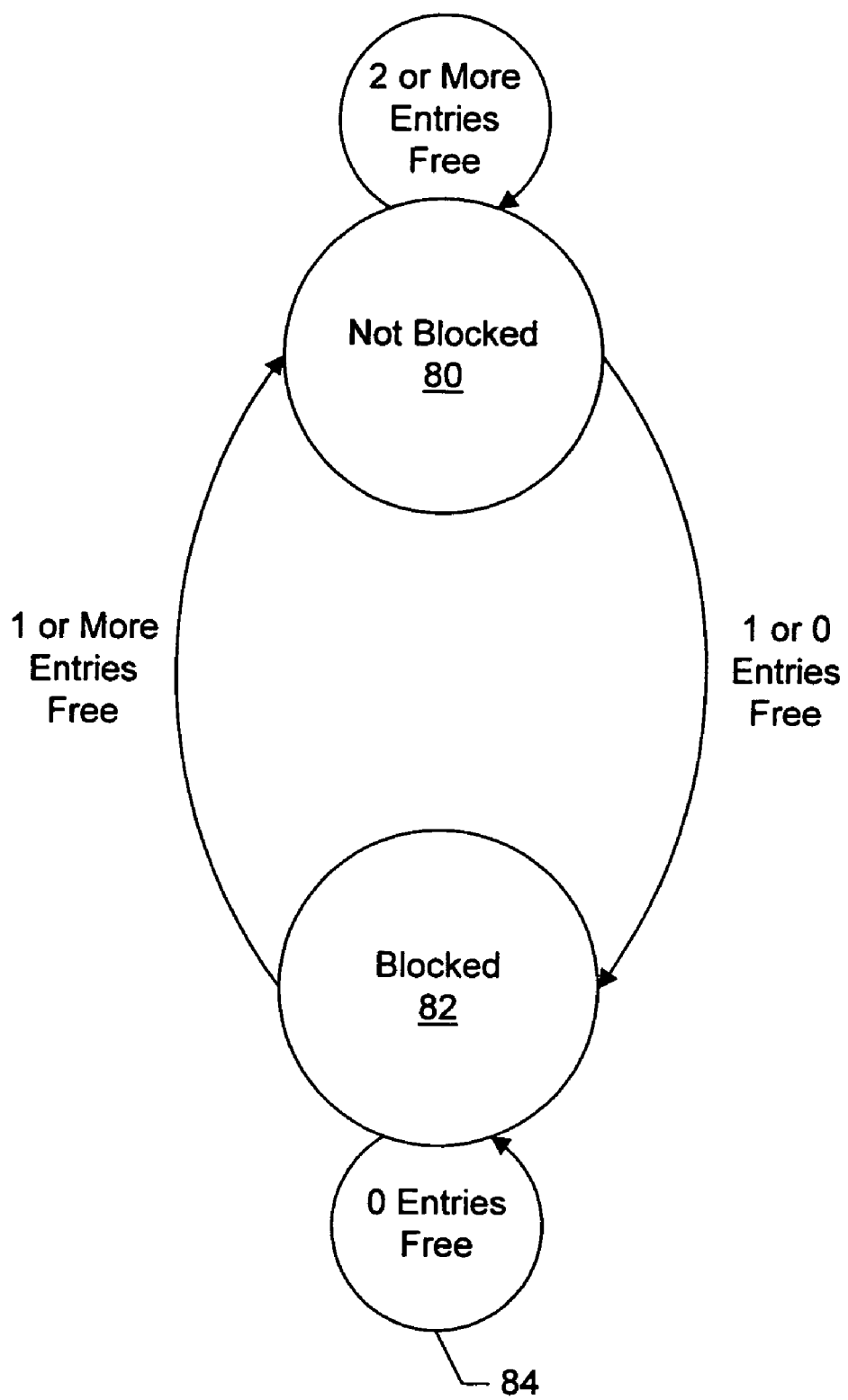
FIG. 6 is a state machine which may be employed by one embodiment of a block circuit shown in FIG. 2.

Turning next to FIG. 6, a state machine is shown which may be used by a block circuit implementing the assertion of the block signal every other clock cycle while an input queue entry remains free. Other embodiments are possible and contemplated. In the embodiment of FIG. 6, the state machine includes a not blocked state 80 and a block state 82. In the not blocked state 80, the block signal is deasserted by the block circuit. In the blocked state 82, the block signal is asserted by the block circuit.

The state machine remains in the not blocked state 80 as long as two or more input queue entries are free to store new transactions. If one or zero entries are free (counting the entry being filled by a newly received transaction as not free), the state machine transactions to blocked state 82. The state machine remains in blocked state 82 if zero entries are free, and transitions back to not blocked state 80 if one or more entries are free. Thus, if exactly one entry is free, the state machine may oscillate between the not blocked state 80 and the blocked state 82.

A similar state machine may be used for embodiments which assert the block signal every cycle if one or zero input queue entries are free. In such an embodiment, the arrow 84 indicating that the state machine remains in the blocked state 82 would read "zero or one entries free", and the transition from the blocked state 82 to the not blocked state 80 would read "2 or more entries free".

Figure 7:
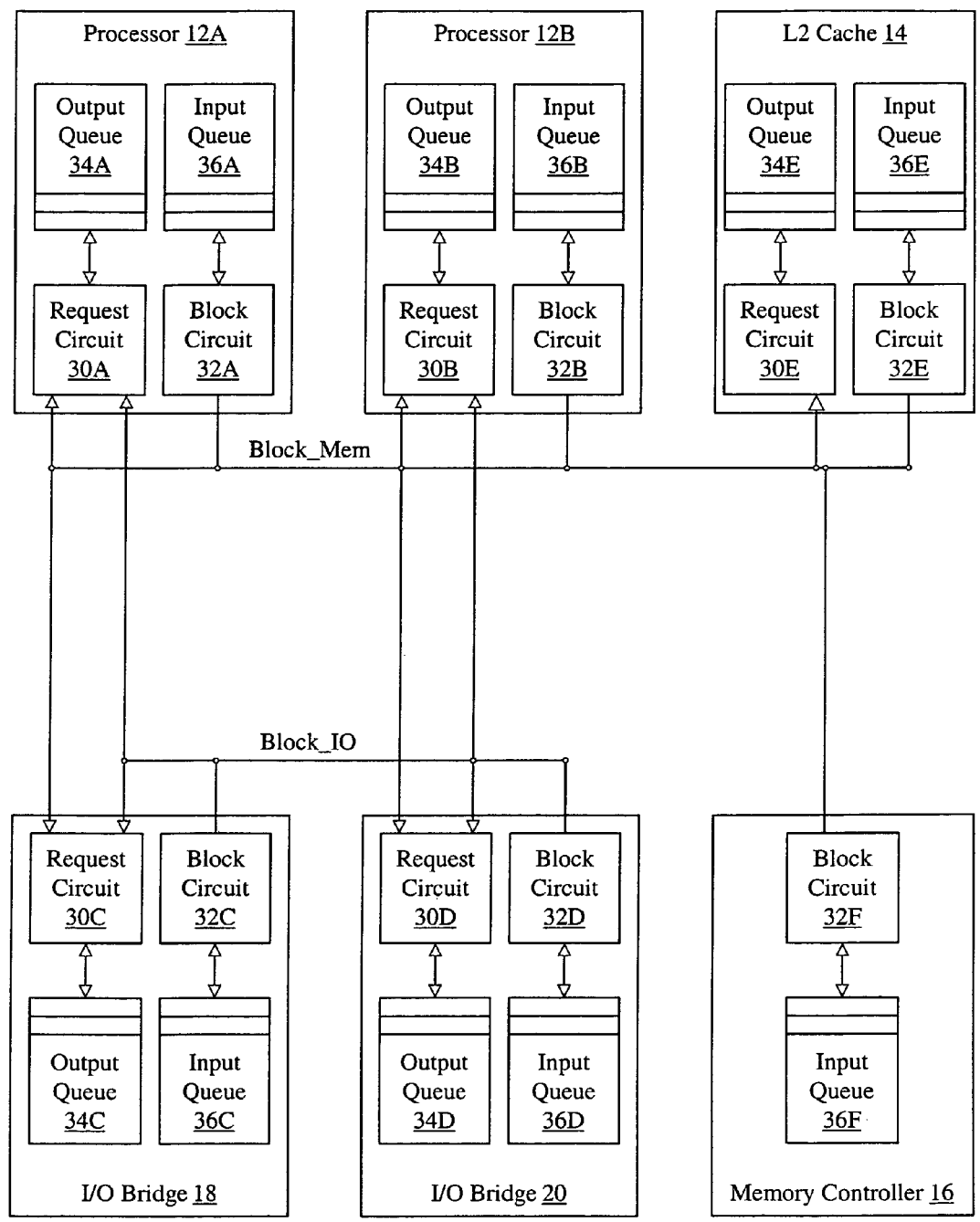
FIG. 7 is a block diagram of the agents shown in FIG. 1, highlighting a second embodiment of the interconnect therebetween.

Turning next to FIG. 7, an alternative embodiment of the block signals is illustrated. The embodiment illustrated in FIG. 2 includes a separate block signal for each agent. On the other hand, the embodiment illustrated in FIG. 7 includes a block signal corresponding to the memory space (Block_Mem) and a block signal corresponding to the I/O space (the combination of the address spaces mapped to I/O bridge 18 and I/O bridge 20—Block_IO). Each of block circuits 32A, 32B, 32E, and 32F are coupled to the Block_Mem signal and each of block circuits 32C–32D are coupled to the Block_IO signal. Each of request circuits 30A–30E is coupled to receive both the Block_Mem and Block_IO signals.

If any agent which is a participant in memory space transactions is unavailable to participate in additional transactions, that agent asserts the Block_Mem signal. Similarly, if any agent which is a participant in I/O space transactions is unavailable to participate in additional transactions, that agent asserts the Block_IO signal. Thus, the embodiment of FIG. 7 may provide for a less granular determination of blockage, and may occasionally block a transaction which may not need to be blocked. However, the embodiment of FIG. 7 includes fewer signals, and also keeps memory space separate from I/O space. Separating memory and I/O space may, in some embodiments, provide substantial performance benefits (e.g. decrease in wasted bandwidth, increase in useful bandwidth).

The request circuits 30A–30E may be similar to the embodiment of FIG. 3, except that the decoder may decode only memory versus I/O space and each decoded signal may be combined with the corresponding block signal in a manner similar to that shown in FIG. 3.

Figure 8:
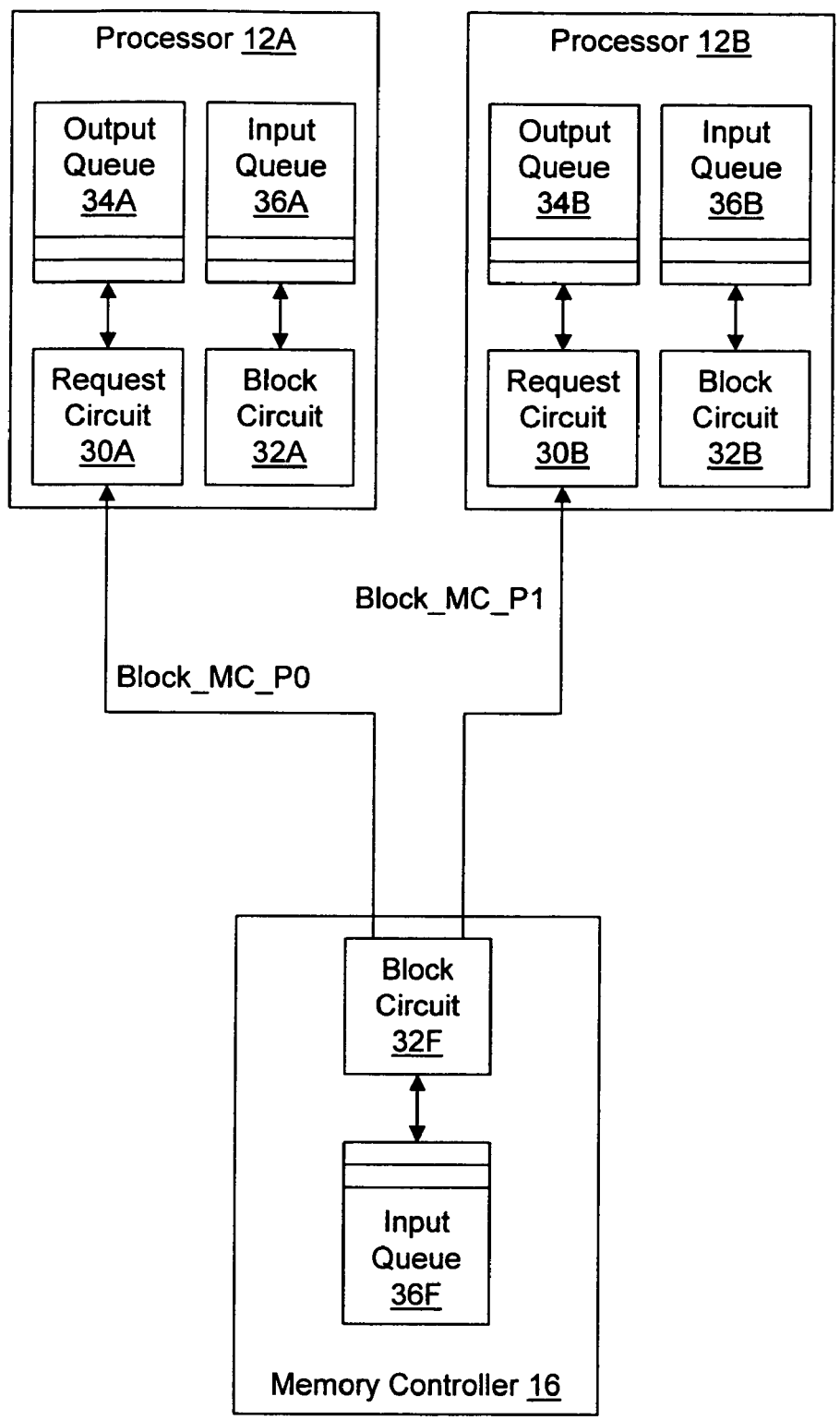
FIG. 8 is a block diagram of a pair of processors and a memory controller illustrated in FIG. 1, highlighting a third embodiment of the interconnect therebetween.

FIG. 8 illustrates a third embodiment of block signals between processors 12A–12B and memory controller 16. In the embodiment of FIG. 8, memory controller 16 provides a separate block signal to each of processors 12A and 12B. The Block_MC_P0 signal is coupled between block circuit 32F and request circuit 30A, while the Block$_{13}$ MC_P1 signal is coupled between block circuit 32F and request circuit 30B.

Block circuit 32F may use the separate processor block signals to independently block one of processors 12A–12B from initiating additional memory transactions while permitting the other one of processors 12A–12B to initiate additional memory transactions (assuming none of the other block signals corresponding to memory transaction participants is asserted). For example, if processor 12A has initiated one or more transactions that have missed L2 cache 14 and are queued in memory controller 16 to be read from memory 26, block circuit 32F may assert the Block_MC_P0 signal. Thus, if processor 12B has memory transactions to initiate and these transactions hit in L2 cache 14, processor 12B may have more opportunities to perform these transactions (and complete them with the lower L2 cache latency) while the transactions initiated by processor 12A are serviced by memory controller 16. Since the transactions which hit in L2 cache 14 are not queued by memory controller 16 (or are queued and deleted after L2 cache 14 signals a hit), the number of transactions that may occur before a block due to queue fullness in memory controller 16 occurs may be increased if transactions from processor 12B hit in L2 cache 14. Frequently, misses in a cache are clustered close together in time and thus transactions from processor 12B may be more likely to hit in L2 cache 14 than additional transactions from processor 12A in the above example.

Figure 9:
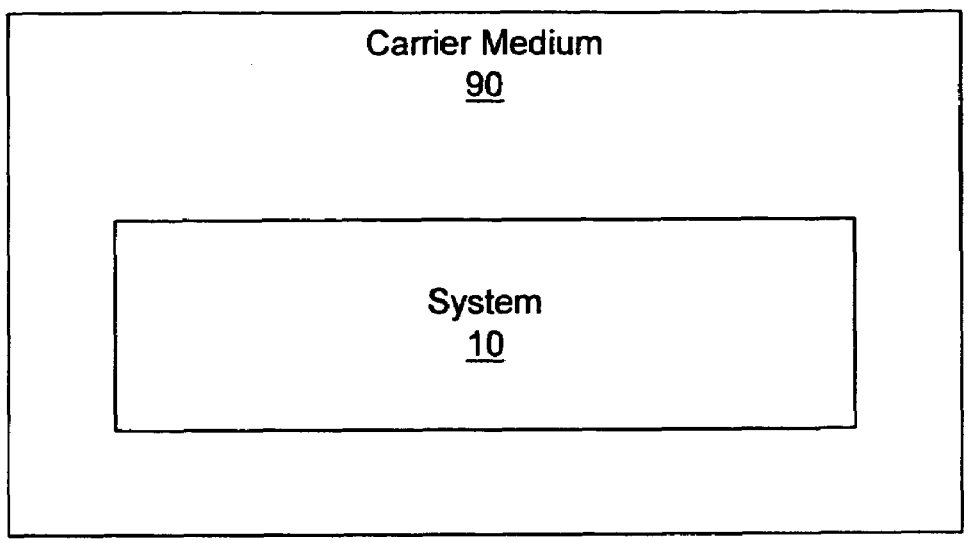
FIG. 9 is a block diagram of a carrier medium.

Turning next to FIG. 9, a block diagram of a carrier medium 90 including a database representative of system 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the database of system 10 carried on carrier medium 90 may be a database which can be read by a program and used, directly or indirectly, to fabricate the hardware comprising system 10. For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates in a synthesis library. The netlist comprises a set of gates which also represent the functionality of the hardware comprising system 10. The netlist may then be placed and routed to produce a data set describing geometric shapes to be applied to masks. The masks may then be used in various semiconductor fabrication steps to produce a semiconductor circuit or circuits corresponding to system 10. Alternatively, the database on carrier medium 90 may be the netlist (with or without the synthesis library) or the data set, as desired.

While carrier medium 90 carries a representation of system 10, other embodiments may carry a representation of any portion of system 10, as desired, including arbiters, agents, block circuits, request circuits, input queues, output queues etc.

Numerous variations and modifications will become apparent to those skilled in the art once the above disclosure is fully appreciated. It is intended that the following claims be interpreted to embrace all such variations and modifications.

What is claimed is:

1. A system comprising:
   a first agent having a first circuit to generate a first signal, wherein said first signal is indicative, in a first state, that said first agent is available to participate in subsequent transactions with a plurality of other agents on a bus, and wherein said first signal is indicative, in a second state, that said first agent is unavailable to participate in subsequent transactions with said plurality of said other agents; and
   a second agent having a second circuit coupled to receive said first signal from said first circuit, wherein when said second agent is to initiate a first transaction with said first agent, said second circuit to identify an address of said first transaction as related to said first agent and in response, said second circuit determines if said first signal from said first circuit is in said first or second state and said second agent to perform said first transaction with said first agent when said first signal is in said first state.

2. The system as recited in claim 1 wherein said second circuit inhibits said second agent from initiating said first transaction if said first signal is in said second state.

3. The system as recited in claim 2 wherein said first agent includes an internal cache to be snooped in response to said first transaction.

4. The system as recited in claim 2 wherein said first agent includes a cache and said first transaction is a cacheable transaction for said cache.

5. The system as recited in claim 2 wherein said second circuit inhibits initiating said first transaction by preventing arbitration for said bus on which said first transaction is to be transmitted.

6. The system as recited in claim 2 wherein said second circuit inhibits initiating said first transaction by transmitting an invalid command if said second agent wins an arbitration for said bus on which said first transaction is to be transmitted.

7. The system as recited in claim 1 wherein said first agent includes a queue to store a plurality of transactions and wherein said first or second state of said first signal is responsive to a number of free entries available in said queue.

8. The system as recited in claim 7 wherein said first signal generates said second state responsive to one or fewer free entries remaining in said queue.

9. The system as recited in claim 1 further comprising a third agent having a third circuit to generate a second signal in which a state of said second signal indicates availability of said third agent to participate in subsequent transactions with said plurality of agents on said bus and wherein said second circuit of said second agent is coupled to receive said second signal wherein said second circuit to identify an address of a second transaction from said second agent as related to said third agent and in response, determines if said second signal from said third circuit is in a state to allow said second agent to perform said second transaction.

10. The system as recited in claim 9 wherein said second circuit inhibits said second agent from initiating said second transaction if said second signal is in a state in which said third agent is not available for said second transaction.

11. The system as recited in claim 10 wherein said first signal is indicative of whether or not a memory transaction is to be issued.

12. The system as recited in claim 11 wherein said second signal is indicative of whether or not an input/output transaction is to be issued.

13. An apparatus comprising:
a storage device to store a first transaction to be performed with a first agent; and
a circuit coupled to said storage device and also coupled to a bus to receive a first signal indicative of whether or not said first agent is available to participate in transactions initiated by one of a plurality of agents coupled to said bus, and wherein said circuit is included within a second agent, in which said circuit to identify an address of said first transaction as related to said first agent and in response, said circuit determines if said first signal indicates if said first agent is available and if said first agent is available, to perform said first transaction with said first agent.

14. The apparatus as recited in claim 13 wherein said circuit inhibits initiating said first transaction if said first signal indicates that said first agent is not available.

15. The apparatus as recited in claim 13 wherein said circuit inhibits arbitration for said bus to initiate said first transaction if said first signal indicates that said first agent is unavailable.

16. The apparatus as recited in claim 14 wherein said circuit performs an invalid command on said bus if said second agent wins an arbitration for said bus to initiate said first transaction, but said first signal indicates that said first agent is unavailable to participate in transactions with said plurality of agents on said bus, including said second agent.

17. The apparatus as recited in claim 14 wherein said circuit decodes said address and performs a logical operation of a decoded signal with said first signal to generate a control signal to allow or not allow said first transaction.

18. The apparatus as recited in claim 13 wherein said storage device includes a queue to store a plurality of transactions to be initiated by said second agent.

19. The apparatus as recited in claim 13 wherein said circuit is coupled to receive a second signal indicative of whether or not a third agent is available to participate in transactions with said plurality of agents coupled on said bus, and wherein said circuit to inhibit initiation of a second transaction with said third agent, if said second signal indicates that said third agent is unavailable to participate in transactions.

20. A method comprising:
receiving a first signal indicative of whether or not a first agent is available to participate in subsequent transactions with a plurality of agents coupled on a bus, including a second agent;
identifying an address of a first transaction of said second agent as a transaction with said first agent;
performing a logical operation of a decoded address signal of said first transaction with said first signal to generate a control signal; and
inhibiting initiation of said first transaction by use of said control signal, if said first signal indicates that said first agent is unable to participate in said first transaction.

21. The method as recited in claim 20 further including performing said first transaction if said first agent includes an internal cache to be snooped in response to said first transaction and if said first agent is available.

22. The method as recited in claim 20 further including performing said first transaction if said first agent includes a cache and said first transaction is a cacheable transaction and if said first agent is available.

23. The method as recited in claim 20 wherein said inhibiting includes inhibiting arbitration for a bus on which said first transaction is to be initiated.

24. The method as recited in claim 20 wherein said inhibiting includes transmitting an invalid command on said bus, if an arbitration for said bus is won by said second agent to initiate said first transaction, but said first agent is unavailable.

25. The method as recited in claim 20 further comprising:
receiving a second signal indicative of whether or not a third agent is available to participate in subsequent transactions on the bus with said plurality of agents, including said second agent; and
inhibiting initiation of a second transaction by said second agent to transact with said third agent if said second signal indicates that said third agent is unavailable to participate in transactions.

26. A carrier medium comprising a database which is operated upon by a program executable on a computer system, the program operating on the database to perform a portion of a process to fabricate an integrated circuit including circuitry described by the database, the circuitry described in the database including a system comprising:
a first agent having a first circuit to generate a first signal, wherein said first signal is indicative, in a first state, that said first agent is available to participate in subsequent transactions with a plurality of other agents on a bus, and wherein said first signal is indicative, in a second state, that said first agent is unavailable to participate in subsequent transactions with said plurality of said other agents; and a second agent having a second circuit coupled to receive said first signal from said first circuit, wherein when said second agent is to initiate a first transaction with said first agent, said second circuit to identify an address of said first transaction as related to said first agent and in response, said second circuit determines if said first signal from said first circuit is in said first or second state and said second agent to perform said first transaction with said first agent when said first signal is in said first state.

27. The carrier medium as recited in claim 26 wherein said second circuit inhibits said second agent from initiating said first transaction if said first signal is in said second state.

28. The carrier medium as recited in claim 27 wherein said first agent includes an internal cache to be snooped in response to said first transaction.

29. The carrier medium as recited in claim 27 wherein said first agent includes a cache and said first transaction is a cacheable transaction for said cache.

30. The carrier medium as recited in claim 27 wherein said second circuit inhibits initiating said first transaction by preventing arbitration for said bus on which said first transaction is to be transmitted.

31. The carrier medium as recited in claim 27 wherein said second circuit inhibits initiating said first transaction by transmitting an invalid command if said second agent wins an arbitration for said bus on which said first transaction is to be transmitted.

32. The carrier medium as recited in claim 26 wherein said first agent includes a queue to store a plurality of transactions and wherein said first or second state of said first signal is responsive to a number of free entries available in said queue.

33. The carrier medium as recited in claim 32 wherein said first signal generates said second state responsive to one or fewer free entries remaining in said queue.

34. The carrier medium as recited in claim 26 wherein the system further comprises a third agent having a third circuit to generate a second signal in which a state of said second signal indicates availability of said third agent to participate in subsequent transactions with said plurality of agents on said bus and wherein said second circuit of said second agent is coupled to receive said second signal wherein said second circuit to identify an address of a second transaction from said second agent as related to said third agent and in response, determines if said second signal from said third circuit is in a state to allow said second agent to perform said second transaction.

35. The carrier medium as recited in claim 34 wherein said second circuit inhibits said second agent from initiating said second transaction if said second signal is in a state in which said third agent is not available for said second transaction.

36. The carrier medium as recited in claim 35 wherein said first signal is indicative of whether or not a memory transaction is to be issued.

37. The carrier medium as recited in claim 36 wherein said second signal is indicative of whether or not an input/output transaction is to be issued.

38. A carrier medium comprising a database which is operated upon by a program executable on a computer system, the program operating on the database to perform a portion of a process to fabricate an integrated circuit including circuitry described by the database, the circuitry described in the database including an apparatus comprising:

a storage device to store a first transaction to be performed with a first agent; and a circuit coupled to said storage device and also coupled to a bus to receive a first signal indicative of whether or not said first agent is available to participate in transactions initiated by one of a plurality of agents coupled to said bus, and wherein said circuit is included within a second agent, in which said circuit to identify an address of said first transaction as related to said first agent and in response, said circuit determines if said first signal indicates if said first agent is available and if said first agent is available, to perform said first transaction with said first agent.

39. The carrier medium as recited in claim 38 wherein said circuit inhibits initiating said first transaction if said first signal indicates that said first agent is not available.

40. The carrier medium as recited in claim 39 wherein said circuit inhibits arbitration for said bus to initiate said first transaction if said first signal indicates that said first agent is unavailable.

41. The carrier medium as recited in claim 39 wherein said circuit performs an invalid command on said bus if said second agent wins an arbitration for said bus to initiate said first transaction, but said first signal indicates that said first agent is unavailable to participate in transactions with said plurality of agents on said bus, including said second agent.

42. The carrier medium as recited in claim 39 wherein said circuit decodes said address and performs a logical operation of a decoded signal with said first signal to generate a control signal to allow or not allow said first transaction.

43. The carrier medium as recited in claim 38 wherein said storage device includes a to store a plurality of transactions to be initiated by said second agent.

44. The carrier medium as recited in claim 38 wherein said circuit is coupled to receive a second signal indicative of whether or not a third agent is available to participate in transactions with said plurality of agents coupled on said bus, and wherein said circuit to inhibit initiation of a second transaction with said third agent, if said second signal indicates that said third agent is unavailable to participate in transactions.

* * * * *

UNITED STATES PATENT AND TRADEMARK OFFICE
CERTIFICATE OF CORRECTION

PATENT NO. : 7,028,115 B1
APPLICATION NO. : 09/680524
DATED : April 11, 2006
INVENTOR(S) : Joseph Rowlands et al.

Page 1 of 1

It is certified that error appears in the above-identified patent and that said Letters Patent is hereby corrected as shown below:

Column 18, line 46, in Claim 43: replace "includes a to" with --includes a queue to--.

Signed and Sealed this

Eleventh Day of November, 2008

JON W. DUDAS
*Director of the United States Patent and Trademark Office*